United States Patent
Zhu et al.

(10) Patent No.: US 11,733,524 B1
(45) Date of Patent: Aug. 22, 2023

(54) DEPTH CAMERA ASSEMBLY BASED ON NEAR INFRA-RED ILLUMINATOR

(71) Applicant: Meta Platforms Technologies, LLC, Menlo Park, CA (US)

(72) Inventors: Zhaoming Zhu, Redmond, WA (US); Nicholas Daniel Trail, Bothell, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 16 days.

(21) Appl. No.: 17/329,799

(22) Filed: May 25, 2021

Related U.S. Application Data

(63) Continuation of application No. 15/886,233, filed on Feb. 1, 2018, now Pat. No. 11,061,234.

(51) Int. Cl.
*G02B 27/01* (2006.01)
*G06T 7/70* (2017.01)
*G01S 17/10* (2020.01)

(52) U.S. Cl.
CPC .......... *G02B 27/0172* (2013.01); *G01S 17/10* (2013.01); *G06T 7/70* (2017.01); *G02B 2027/0178* (2013.01)

(58) Field of Classification Search
CPC .. H04N 13/254; H04N 5/2256; H04N 13/344; H04N 5/2354; H04N 13/271; H04N 13/239; H04N 13/243; H04N 5/2226; H04N 13/383; G02B 2027/014; G02B 27/017; G06T 7/521; G06T 2207/10028; G06T 2207/10152; G06T 7/50; G01B 11/25; G01B 11/255; G01B 11/254; G01S 17/10; G03B 17/54
(Continued)

(56) References Cited

U.S. PATENT DOCUMENTS 7,876,340 B2 1/2011 Russell et al.
8,350,847 B2 1/2013 Shpunt
(Continued)

FOREIGN PATENT DOCUMENTS

JP 2000318210 A 11/2000
RU 2663681 C2 8/2018

OTHER PUBLICATIONS

Xiong et al. "Depth sensing with focus and exposure adaptation" IEEE, Jan. 17, 2013, 6 Pages (Year: 2013).*
(Continued)

*Primary Examiner* — Nathnael Aynalem
(74) *Attorney, Agent, or Firm* — Fenwick & West LLP

(57) ABSTRACT

A depth camera assembly for depth sensing of a local area includes an illumination source, an imaging device, and a controller. The illumination source illuminates a local area with light emitted in accordance with emission instructions generated by the controller. The illumination source includes an array of optical sources and an optical assembly. Operation of each optical source in the array is controllable based in part on the emission instructions. The optical assembly is configured to project the light into the local area. The imaging device captures one or more images of at least a portion of the light reflected from one or more objects in the local area. The controller determines depth information for the one or more objects based in part on the captured one or more images.

18 Claims, 8 Drawing Sheets

(58) Field of Classification Search
USPC .................. 348/78, 136, 164, 370; 359/569
See application file for complete search history.

(56) References Cited

U.S. PATENT DOCUMENTS

| | | | |
|---|---|---|---|
| 9,443,310 | B2 | 9/2016 | Hudman et al. |
| 10,116,925 | B1 | 10/2018 | Wang et al. |
| 10,181,200 | B1 | 1/2019 | Chao et al. |
| 10,185,151 | B2 | 1/2019 | Lee et al. |
| 10,209,202 | B1* | 2/2019 | Sullivan ............. G01N 21/8806 |
| 10,250,789 | B2* | 4/2019 | Lee ........................ G06V 10/60 |
| 10,295,827 | B1 | 5/2019 | Chao et al. |
| 10,827,163 | B2 | 11/2020 | Trail et al. |
| 2003/0020705 | A1 | 1/2003 | Kondo et al. |
| 2006/0103815 | A1 | 5/2006 | Peterson |
| 2006/0263077 | A1 | 11/2006 | Endo |
| 2008/0246706 | A1* | 10/2008 | Russell ................. G09G 3/346 |
| | | | 345/84 |
| 2010/0290698 | A1 | 11/2010 | Freedman et al. |
| 2012/0089364 | A1* | 4/2012 | Takabayashi .......... G01B 11/25 |
| | | | 702/167 |
| 2012/0133954 | A1* | 5/2012 | Takabayashi ...... G01B 11/2536 |
| | | | 356/610 |
| 2013/0076896 | A1 | 3/2013 | Takabayashi et al. |
| 2013/0176533 | A1 | 7/2013 | Raffle et al. |
| 2013/0215235 | A1 | 8/2013 | Russell |
| 2014/0028801 | A1* | 1/2014 | Tin ...................... H04N 13/204 |
| | | | 348/136 |
| 2014/0168662 | A1 | 6/2014 | Takabayashi et al. |
| 2015/0116582 | A1* | 4/2015 | Yoshikawa ............ G01B 11/25 |
| | | | 348/362 |
| 2015/0229912 | A1* | 8/2015 | Masalkar ............. H04N 13/254 |
| | | | 348/46 |
| 2015/0253428 | A1* | 9/2015 | Holz ...................... G01S 17/36 |
| | | | 356/5.01 |
| 2016/0150219 | A1 | 5/2016 | Gordon et al. |
| 2016/0176533 | A1 | 6/2016 | Cazals et al. |
| 2016/0274679 | A1 | 9/2016 | Romano et al. |
| 2017/0264798 | A1 | 9/2017 | Tanaka |
| 2017/0277950 | A1 | 9/2017 | Sung et al. |
| 2017/0287157 | A1 | 10/2017 | Seto |
| 2017/0337702 | A1 | 11/2017 | Chang |
| 2017/0374355 | A1* | 12/2017 | Ko ........................ G01S 7/4815 |
| 2018/0048880 | A1 | 2/2018 | Trail et al. |
| 2018/0160085 | A1 | 6/2018 | Bazin et al. |
| 2018/0205937 | A1* | 7/2018 | Zhu ........................ G06F 3/012 |
| 2018/0253863 | A1* | 9/2018 | Wallack .................. G06T 7/521 |
| 2018/0267663 | A1 | 9/2018 | Cho et al. |
| 2019/0041197 | A1 | 2/2019 | Gernoth et al. |
| 2019/0129291 | A1* | 5/2019 | D'Oosterlinck ..... G03B 21/206 |

OTHER PUBLICATIONS

Non-Final Office Action dated Jan. 4, 2022 for U.S. Appl. No. 16/521,419, filed Jul. 24, 2019, 12 pages.

Xiong, Z. et al. "Depth Sensing with Focus and Exposure Adaptation." 2012 Visual Communications and Image Processing, IEEE, Nov. 27-30, 2012, pp. 1-6.

Non-Final Office Action dated Oct. 5, 2022 for U.S. Appl. No. 17/728,560, filed Apr. 25, 2022, 14 pages.

* cited by examiner

DEPTH CAMERA ASSEMBLY BASED ON NEAR INFRA-RED ILLUMINATOR

CROSS REFERENCE TO RELATED APPLICATIONS

This application is a continuation of co-pending U.S. application Ser. No. 15/886,233, filed Feb. 1, 2018, which is incorporated by reference in its entirety.

TECHNICAL FIELD

The present disclosure generally relates to depth sensing, and specifically relates to a depth camera assembly based on a near infra-red (NIR) illuminator for three-dimensional depth sensing.

BACKGROUND

Conventional three-dimensional (3D) depth sensors often utilize a near infra-red (NIR) illuminator as a source of light. The conventional structured light based 3D depth sensors typically use diffractive optical elements (DOEs) to split a laser beam emitted from the NIR illuminator and to form a spatially random dot pattern. Alternatively, the conventional structured light based 3D depth sensors can use micro electro-mechanical system (MEMS) mirrors to scan a line beam emitted from the NIR illuminator and to form a dynamic linear pattern. The conventional indirect time-of-flight 3D depth sensors typically use a diffuser to shape an amplitude-modulated laser beam emitted from the NIR illuminator into a desired field-of-view uniformly. For stereo vision based 3D depth sensors, the conventional NIR illumination is desired to address either texture-less scenes or operation in low intensity light conditions. The conventional NIR illuminators can either form certain random textures or just flood illumination light at a local area. One conventional way to achieve a patterned NIR illumination is an approach based on a video projector where a pattern mask (e.g., illuminated by a NIR light source) is projected into a scene by using a projection lens. Another conventional way to achieve a patterned NIR illumination is to use a diffuser to form a speckle type texture in the scene. Yet another conventional NIR projector is based on the Lau's effect where an array of emitters together with an array of micro-lenses (e.g., the emitter array and the micro-lens array are separated by the Talbot's distance) generate a regular array of interferometric pattern. However, the conventional NIR illuminators are not able to provide dynamically adaptable and variable illumination patterns for achieving high quality depth sensing with less dissipated power.

SUMMARY

A depth camera assembly (DCA) determines depth information associated with one or more objects in a local area. The DCA comprises an illumination source, an imaging device and a controller. The illumination source is configured to illuminate a local area with light in accordance with emission instructions. The illumination source includes an array of optical sources and a projection assembly. Operation of each optical source in the array can be controlled based in part on the emission instructions to emit the light from the array of optical sources. The projection assembly is an optical assembly configured to project the light into the local area. The imaging device is configured to capture one or more images of at least a portion of the light reflected from the one or more objects in the local area. The controller generates the emission instructions, provides the emission instructions to the illumination source, and determines the depth information for the one or more objects based in part on the captured one or more images.

In some embodiments, an eyeglass-type platform representing a near-eye display (NED) can further integrate the DCA. The NED further includes an electronic display and an optical assembly. The NED may be part of an artificial reality system. The electronic display of the NED is configured to emit image light. The optical assembly of the NED is configured to direct the image light to an eye-box of the NED corresponding to a location of a user's eye. The image light may comprise the depth information of the one or more objects in the local area determined by the DCA.

Figure 1:
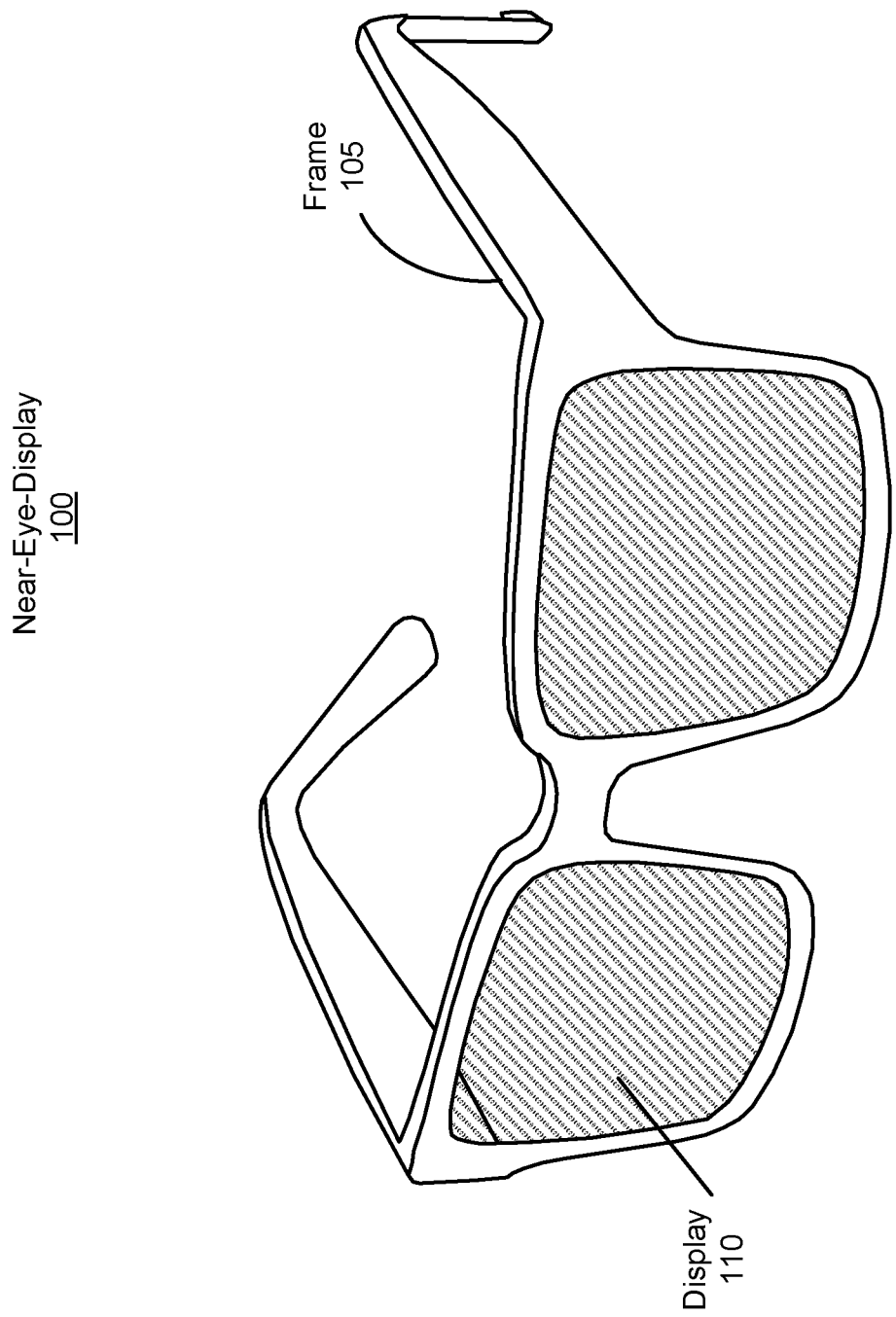
FIG. 1 is a diagram of a near-eye-display (NED), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye display (NED), a mobile device or computing system, or any other hardware platform capable of providing artificial reality content to one or more viewers.

A depth camera assembly (DCA) for determining depth information of one or more objects in a local area surrounding some or all of the DCA is presented herein. The DCA includes an illumination source, a camera assembly, and a controller. The illumination source includes a two-dimensional array of optical sources, and an optical assembly. Each optical source in the array can be referred to herein as a pixel. Each pixel can be implemented as, e.g., a micro light-emitting diode (μLED), a micro super luminescent diode (μSLD), a vertical-cavity surf ace-emitting laser (VCSEL), a micro resonant cavity light-emitting diode (μRCLED), etc. The pixel array generates light that is projected into a local area by the optical assembly. The pixels in the array are addressable such that they may be controlled individually or in groups, e.g., based in part on emission instructions from the controller. Accordingly, the controller can control a specific pattern of light emitted from the pixel array into the local area. Additionally, the controller may control location of light being projected into the local area. In some embodiments, the controller also controls an intensity value (e.g., selected from a range of values) of some or all of the pixels in the array to, e.g., increase projection density into the local area by providing further contrast limits beyond activation or deactivation of pixels in the array. The optical assembly includes one or more optical elements (e.g., lenses). In some embodiments, the optical assembly may include a micro-lens assembly positioned in front of the pixel array. Alternatively, the micro-lens assembly may be part of the pixel array. The camera assembly captures images of the light reflected/scattered off objects in the local area. The controller determines depth information using the captured images. The DCA may be configured to determine the depth information using structured light techniques, time of flight techniques, some other depth determination technique, or some combination thereof.

The DCA may be integrated into a NED. The NED may be part of an artificial reality system. The NED may also be referred to as a head-mounted display (HMD). The NED further includes an electronic display and an optical assembly. The electronic display is configured to emit image light. The optical assembly of the NED is configured to direct the image light to an eye-box of the NED corresponding to a location of a user's eye, the image light comprising the depth information of the one or more objects in the local area determined by the DCA. FIG. 1 is a diagram of a NED 100, in accordance with one or more embodiments.

The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 may be part of an artificial reality system (not shown). The NED 100 is generally configured to operate as an artificial reality NED. In some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. The display 110 generates an image light to present media to an eye of the user. The NED 100 shown in FIG. 1 is only an example of an artificial reality system. However, in alternate embodiments, the NED 100 may also be referred to as a HMD.

Figure 2:
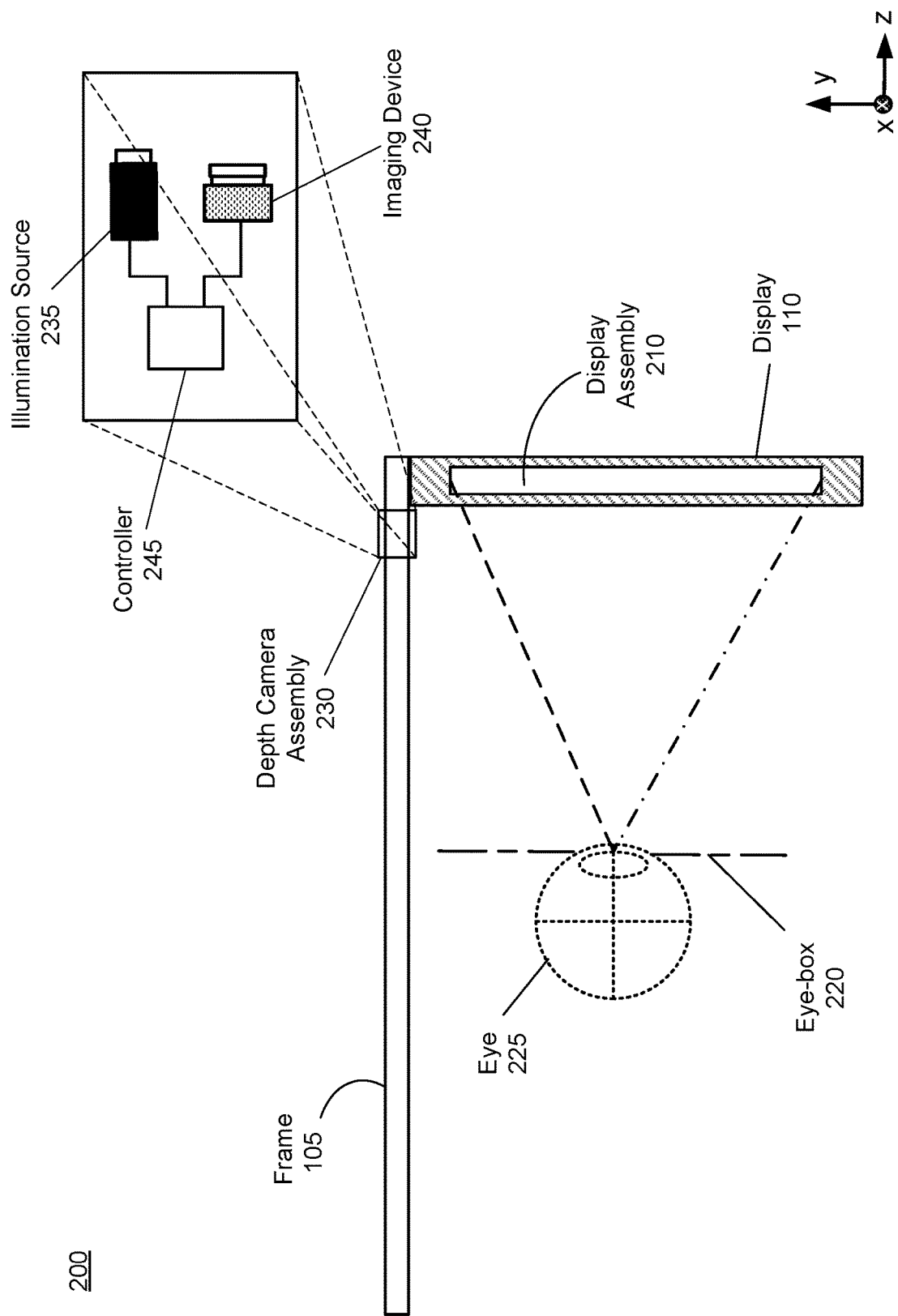
FIG. 2 is a cross-section of an eyewear of the NED in FIG. 1, which may include a depth camera assembly (DCA), in accordance with one or more embodiments.

FIG. 2 is a cross section 200 of an eyewear of the NED 100 illustrated in FIG. 1, in accordance with one or more embodiments. The cross section 200 includes at least one display assembly 210 integrated into the display 110, an eye-box 220, and a DCA 230. The eye-box 220 is a location where an eye 225 is positioned when a user wears the NED 100. In some embodiments, the frame 105 may represent a frame of eye-wear glasses. For purposes of illustration, FIG. 2 shows the cross section 200 associated with a single eye 225 and a single display assembly 210, but in alternative embodiments not shown, another display assembly which is separate from the display assembly 210 shown in FIG. 2, provides image light to another eye 225 of the user.

The display assembly 210 is configured to direct the image light to the eye 225 through the eye-box 220. In some embodiments, when the NED 100 is configured as an AR NED, the display assembly 210 also directs light from a local area surrounding the NED 100 to the eye 225 through the eye-box 220. The display assembly 210 may be configured to emit image light at a particular focal distance in accordance with varifocal instructions, e.g., provided from a varifocal module (not shown in FIG. 2).

The display assembly 210 may be composed of one or more materials (e.g., plastic, glass, etc.) with one or more refractive indices that effectively minimize the weight and present to the user a field of view of the NED 100. In alternate configurations, the NED 100 includes one or more optical elements between the display assembly 210 and the eye 225. The optical elements may act to, e.g., correct aberrations in image light emitted from the display assembly 210, magnify image light, perform some other optical adjustment of image light emitted from the display assembly 210, or some combination thereof. The example for optical elements may include an aperture, a Fresnel lens, a convex lens, a concave lens, a liquid crystal lens, a diffractive element, a waveguide, a filter, a polarizer, a diffuser, a fiber taper, one or more reflective surfaces, a polarizing reflective surface, a birefringent element, or any other suitable optical element that affects image light emitted from the display assembly 210.

The frame 105 further includes a DCA 230 configured to determine depth information of one or more objects in a local area surrounding some or all of the NED 100. The DCA 230 includes an illumination source 235, an imaging device 240, and a controller 245 that may be coupled to at least one of the illumination source 235 and the imaging device 240. In some embodiments (now shown in FIG. 2), the illumination source 235 and the imaging device 240 each may include its own internal controller. In some embodiments (not shown in FIG. 2), the illumination source 235 and the imaging device 240 can be widely separated, e.g., the illumination source 235 and the imaging device 240 can be located in different assemblies.

The illumination source 235 may be configured to illuminate the local area with light in accordance with emission instructions generated by the controller 245. The illumination source 235 may include a plurality of emitters that each emits light having certain characteristics (e.g., wavelength, polarization, coherence, temporal behavior, etc.). The characteristics may be the same or different between emitters, and the emitters can be operated simultaneously or individually. In some embodiments, the plurality of emitters in the illumination source 235 are implemented as a two-dimensional array of optical sources referred to herein as pixels that emit light in a near infra-red (NIR) spectrum, e.g., having one or more wavelengths between approximately 780 nm and 2500 nm. The emitted NIR light may be then projected into the scene by a projection lens of the illumination source 235 (not shown in FIG. 2). Each optical source (pixel) in the illumination source 235 could be, e.g., a μLED, a μRCLED, a VCSEL, a μSLD, some other source that emits in the NTR spectrum, or some combination thereof. In some embodiments, a single emitter or a plurality of emitters in the illumination source 235 can emit one or more light beams. In accordance with embodiments of the present disclosure, the illumination source 235 can be implemented as a versatile and yet power efficient NIR illuminator, which can be utilized with most depth sensing techniques, such as structured light based depth sensing, time-of-flight based depth sensing, stereo vision depth sensing, hybrid depth sensing, etc. More details about a structure and operation of the illumination source 235 of the DCA 230 are disclosed in conjunction with FIGS. 3-5.

The imaging device 240 includes one or more cameras configured to capture one or more images of at least a portion of the light reflected from one or more objects in the local area. In one embodiment, the imaging device 240 is an infrared camera configured to capture images in a NIR spectrum. Additionally, the imaging device 240 may be also configured to capture images of visible spectrum light. The imaging device 240 may include a charge-coupled device (CCD) detector, a complementary metal-oxide-semiconductor (CMOS) detector or some other types of detectors (not shown in FIG. 2). The imaging device 240 may be configured to operate with a frame rate in the range of approximately 30 Hz to approximately 1 KHz for fast detection of objects in the local area. In some embodiments, the imaging device 240 is deactivated for a defined amount of time before being activated again. Alternatively or additionally, the imaging device 240 can operate as instructed by the controller 245 for single or multiple frames, up to a maximum frame rate, which can be in the kilohertz range.

The controller 245 may generate the emission instructions and provide the emission instructions to the illumination source 235 for controlling operation of each individual optical source (pixel) in the illumination source 235. The controller 245 may control, based on the emission instructions, operation of the illumination source 235 to dynamically adjust a pattern of the light illuminating the local area, an intensity of the light pattern, a density of the light pattern, location of the light being projected at the local area, etc. The controller 245 may be also configured to determine depth information for the one or more objects in the local area based in part on the one or more images captured by the imaging device 240. In some embodiments, the controller 245 provides the determined depth information to a console (not shown in FIG. 2) and/or an appropriate module of the NED 100 (e.g., a varifocal module, not shown in FIG. 2). The console and/or the NED 100 may utilize the depth information to, e.g., generate content for presentation on the display 110. More details about controlling operation of the illumination source 235 and determining depth information by the controller 245 are disclosed in conjunction with FIG. 3 and FIG. 5.

In some embodiments, the NED 100 further includes an eye tracker (not shown in FIG. 2) for determining and tracking a position of the eye 225, i.e., an angle and orientation of eye-gaze. Note that information about the position of the eye 225 also includes information about an orientation of the eye 225, i.e., information about user's eye-gaze. Based on the determined and tracked position and orientation of the eye 225, the NED 100 adjusts image light emitted from the display assembly 210. In some embodiments, the NED 100 adjusts focus of the image light and ensures that the image light is in focus at the determined angle of eye-gaze in order to mitigate the vergence-accommodation conflict. Additionally or alternatively, the NED 100 adjusts resolution of the image light by performing foveated rendering of the image light, based on the position of the eye 225. Additionally or alternatively, the NED 100 uses the information on a gaze position and orientation to provide contextual awareness for the user's attention, whether on real or virtual content. The eye tracker generally includes an illumination source and an imaging device (camera). In some embodiments, components of the eye tracker are integrated into the display assembly 210. In alternate embodiments, components of the eye tracker are integrated into the frame 105.

Figure 3:
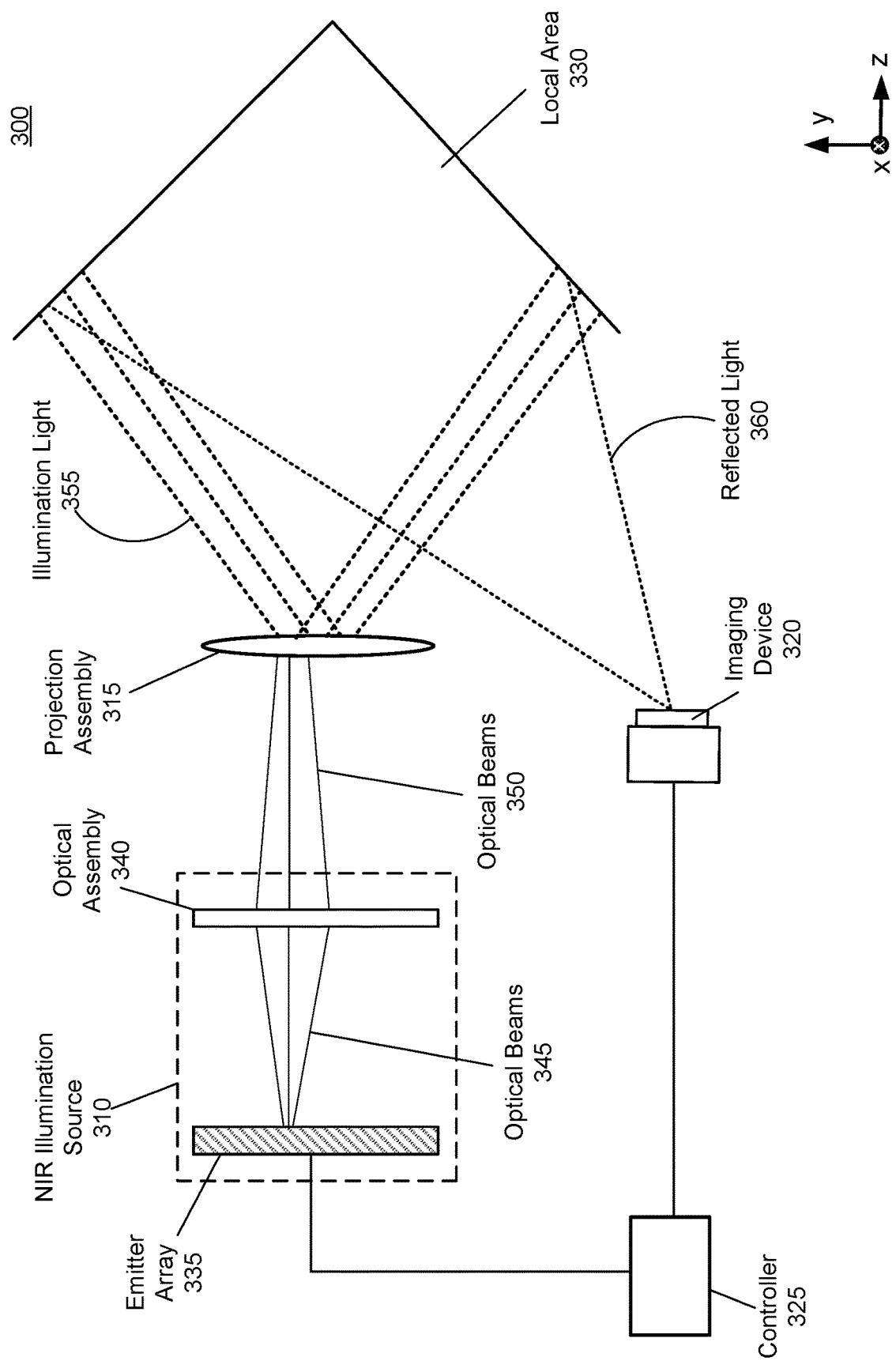
FIG. 3 is an example DCA with a near infra-red (NIR) illuminator, in accordance with one or more embodiments.

FIG. 3 is an example DCA 300 with a NIR illumination source 310, in accordance with one or more embodiments. The DCA 300 is configured for depth sensing over a defined field-of-view using a dynamically adjustable pattern of illumination light. The DCA 300 includes the NIR illumination source 310, a projection assembly 315, an imaging device 320, and a controller 325 coupled to both the NIR illumination source 310 and the imaging device 320. The DCA 300 may be configured to be a component of the NED 100 in FIG. 1. Thus, the DCA 300 may be an embodiment of the DCA 230 in FIG. 2; the NIR illumination source 310 may be an embodiment of the illumination source 235 in FIG. 2; the imaging device 320 may be an embodiment of the imaging device 240 in FIG. 2; and the controller 325 may be an embodiment of the controller 245 in FIG. 2.

The NIR illumination source 310 is configured to emit one or more beams of light in accordance with emission instructions from the controller 325. The emitted light is directed from the NIR illumination source 310 toward the projection assembly 315 for illumination and scanning of a local area 330. The NIR illumination source 310 includes an emitter array 335 and an optical assembly 340.

The emitter array 335 is configured to emit one or more optical beams (controlled emission angles of light) 345, based in part on the emission instructions from the controller 325. The emitter array 335 may include an array of optical sources (pixels) that emit the one or more optical beams 345 in, e.g., the NIR spectrum. The emitter array 335 may consist of a two-dimensional array of NIR optical sources (pixels). The two-dimensional array of pixels in the emitter array 335 may be organized in, e.g., square shape, hexagonal shape, circular shape, or some other suitable shape. For example, the two-dimensional array of pixels in the emitter array 335 may be implemented as a 300×400 pixel array, 250×500 pixel array, or some other pixel array. Each pixel in the emitter array 335 could be implemented as, e.g., a VCSEL, a μLED, a μRCLED, a μSLD, some other source that emits in the NTR spectrum, or some combination thereof. Note that emission sources implemented as μLEDs, μRCLEDs, μSLDs are wide spectrum sources with low mutual correlation (interference), which greatly reducing the speckle effect in light that scans the local area 330. Note also that although VCSELs have similar (i.e., narrow) emission bandwidths as edge-emitting lasers, the uncontrolled polarization instability featured in VCSELs can facilitate mitigation of the speckle effect compared to that of linearly polarized edge-emitting lasers. In some embodiments, a size of each pixel in the emitter array 335 (i.e., an emitter pitch) is approximately equal to 3 µm. In some other embodiments, the emitter pitch may be reduced down to approximately 1 µm. The emitter array 335 is implemented herein to emit light of high level of brightness with high efficiency and high beam quality.

In accordance with embodiments of the present disclosure, operation of each pixel in the emitter array 335 can be individually controlled based in part on the emission instructions from the controller 325 for emitting the one or more optical beams 345. A plurality of optical sources (pixels) in the emitter array 335 are thus addressable in matrix format so that a pattern of the emitted one or more optical beams 345 can be programmed and dynamically changed. By changing patterns of the emitted optical beams 345 different areas of a field-of-view can be illuminated. In some embodiments, a pattern of the emitted optical beams 345 can be changed per data capture and/or frame capture by, e.g., the imaging device 320. In one or more embodiments, there is a 1:1 mapping from pixels in the emitter array 335 to angular coordinates of emitted optical beams 345.

In some embodiments, the emitter array 335 operates in a rolling shutter mode. Operation of the emitter array 335 in the rolling shutter mode may be in sync with corresponding operation of the imaging device 320 to mitigate a jitter effect around the integration window overlap. In the rolling shutter operational mode, the DCA 300 (e.g., the controller 325) may activate optical sources (pixels) of the emitter array 335 row by row, and then designate how long each row is activated for light emission. In an embodiment, each row of the emitter array 335 may be activated for light emission for the same amount of time. Alternatively, at least one row of the emitter array 335 may be activated for light emission for a specific amount of time different than an amount of time other rows of the emitter array 335 are activated. In one or more embodiments, in each active row of the emitter array 335, an intensity of each optical beam 345 emitted from each pixel in that active row can be set to a value between 0 and 100% of a defined maximum intensity value, which may be controlled by, e.g., emission instructions from the controller 325. The intensity of each optical beam 345 may be coded in grayscale with, e.g., 10 bits resolution associated with each pixel in the emitter array 335.

In some other embodiments, the emitter array 335 operates in a global shutter operational mode. Similarly as for the rolling shutter mode, operation of the emitter array 335 in the global shutter mode may be in sync with corresponding operation of the imaging device 320 to mitigate the jitter effect. In one or more embodiments of the global shutter operational mode, all pixels in the emitter array 335 are activated and deactivated on the same timing schedule. In one or more other embodiments, the global shutter operational mode of the emitter array 335 includes the grayscale control achieved through time control, i.e., through delayed activation and/or early deactivation of one or more pixels in the emitter array 335.

Note that the grayscale intensity control can be achieved for each optical beam 345 emitted from each pixel in the emitter array 335. In one embodiment, the grayscale intensity control per each pixel in the emitter array 335 is performed digitally, e.g., based in part on emission instructions from the controller 325. In another embodiment, the grayscale intensity control per each pixel in the emitter array 335 can be achieved in an analog manner through control over current provided to each pixel in the emitter array 335 for a specified amount of time, e.g., based in part on emission instructions from the controller 325. In yet other embodiment, the grayscale intensity control per each pixel in the emitter array 335 is performed through time control, e.g., based in part on emission instructions from the controller 325, wherein each pixel the emitter array 335 can be activated/deactivated at a particular time instant.

The flexibility in controlling each individual pixel in the emitter array 335 leads to compatibility with various structured light depth sensing techniques, stereo vision depth sensing, time-of-flight based depth sensing, or some combination thereof. Additionally, as described in more detail below, the flexibility in controlling each individual pixel in the emitter array 335 provides improved depth sensing performance by enabling robust and online calibration, spatial/temporal multiplexing, as well as power conservation as only a portion of the pixels in the emitter array 335 can be active at a time.

The optical assembly 340 in-couples the one or more optical beams 345 and outputs one or more optical beams 350. In some embodiments, the optical assembly 340 includes an array of micro-lenses (not shown in FIG. 3) positioned in front of the emitter array 335. Each micro-lens in the array of micro-lenses may be positioned in front of a different pixel in the emitter array 335. The micro-lens array implemented within the optical assembly 340 can be applied on the one or more optical beams 345 to improve their beam quality for better system performance with the projection assembly 315. In one or more embodiments, the micro-lens array of the optical assembly 340 performs collimation and energy capture on the optical beams 345 to provide the collimated optical beams 350 to the projection assembly 315. In other embodiment, the micro-lens array within the optical assembly 340 is configured to correct a chief ray angle associated with the one or more optical beams 345 to provide the one or more optical beams 350 with the corrected chief ray angle to the projection assembly 315. The micro-lens array may include a chief ray angle control to achieve between 0 and 30 degrees maximum chief ray angle at a specific predetermined diameter of the emitter array 335. In some other embodiments, the array of micro-lenses is not implemented as part of the optical assembly 340, but instead as part of the emitter array 335. Each micro-lens in the array of micro-lenses implemented within the emitter array 335 may be positioned on top of a different pixel or a group of pixels of the emitter array 335.

The projection assembly 315 is positioned in front of the NIR illumination source 310. The projection assembly 315 includes one or more optical elements, e.g., refractive, reflective and/or diffractive elements such as lenses. The projection assembly 315 projects the one or more optical beams 350 as illumination light 355 into the local area 330, e.g., over a specific field-of-view. A pattern of the illumination light 355 may be dynamically adjustable and variable over time based in part on the emission instructions from the controller 325 that controls operations of individual pixels in the emitter array 335. In some embodiments, the illumination light 355 comprises a structured light pattern. In some other embodiments, the illumination light 355 includes a temporally modulated light pattern. The illumination light 355 illuminates one or more portions of the local area 330, including one or more objects in the local area 330. As the pattern of the illumination light 355 is dynamically adjustable over time, different portions of the local area 330 may be illuminated in different time instants. Reflected light 360 may be generated based on reflection of the illumination light 355 from the one or more objects in the local area 330.

The imaging device 320 captures one or more images of the one or more objects in the local area 330 by capturing at least a portion of the reflected light 360. In one embodiment, the imaging device 320 is an infrared camera configured to capture images in the NIR spectrum. The imaging device 320 may include a CCD detector, a CMOS detector or some other types of detectors (not shown in FIG. 3). The imaging device 320 may be configured to operate with a frame rate in the range of approximately 30 Hz to approximately 1 KHz for fast detection of objects in the local area 330. In some embodiments, the imaging device 320 is deactivated for a defined amount of time before being activated again. Alternatively or additionally, the imaging device 320 can operate as instructed by the controller 245 for single or multiple frames, up to a maximum frame rate, which can be in the kilohertz range. In some embodiments, the imaging device 320 includes a two-dimensional detector pixel array for capturing at least the portion of the reflected light 360. In other embodiments, the imaging device 320 includes more than one camera for capturing at least the portion of the reflected light 360. In some embodiments, the illumination light 355 comprises a structured light pattern, and the imaging device 320 is configured to capture the one or more images of at least a portion of the structured light pattern reflected from the one or more objects in the local area 330. In some embodiments, the illumination light 355 comprises a temporally modulated light pattern, and the imaging device 320 is configured to capture the one or more images of at least a portion of the temporally modulated light pattern reflected from the one or more objects in the local area 330.

The controller 325 generates the emission instructions and provides the emission instructions to the NIR illumination source 310. The controller 325 may control operation of each optical source (pixel) in the emitter array 335, based in part on the emission instructions, such as activation and de-activation of each pixel. In some embodiments, the controller 325 instructs one or more groups of neighboring pixels in the emitter array 335 to emit the optical beams 345 at a particular time instant, based in part on the emission instructions. In this manner, the controller 325 may dynamically adjust a pattern of the illumination light 355 that illuminates the local area 330. Thus, the pattern of the illumination light 355 can be adaptable and variable over time, based in part on the emission instructions from the controller 325. The controller 325 may dynamically adjust the pattern of the illumination light 355 by instructing a defined portion of pixels in the emitter array 335 to emit the optical beams 345, based in part on the emission instructions. The controller 325 may also instruct, dynamically and selectively, one or more specific pixels in the emitter array 335 to emit the one or more optical beams 345 at each time instant, based in part on the emission instructions. Each pixel in the emitter array 335 may emit beams of light in a fast pulsating manner due to a small RC time constant of the pixel, e.g., one beam 345 is emitted per time period that is in the order of nanoseconds or less. In this case, the direct time-of-flight technique can be applied for depth sensing of the local area 330, e.g., the time-of-flight depth sensing based on shifting time windows.

The controller 325 may dynamically change a pattern of the illumination light 355 from one frame to another by selecting a particular group of pixels in the emitter array 335 to emit the one or more optical beams 345, based in part on the emission instructions. In one embodiment, the controller 335 may activate all the pixels in the emitter array 335 to emit the optical beams 345, based in part on the emission instructions. In this way, the NIR illumination source 310 emits the illumination light 355 as flood light, which may be suitable for night vision application of the DCA 300. In one or more other embodiments, the controller 325 provides coded activation of one or more pixels in the emitter array 335 to obtain a specific pattern of the illumination light 355 for scanning of the local area, based in part on the emission instructions, e.g., a line pattern, a dot pattern, etc.

In some embodiments, the controller 325 instructs, dynamically and selectively, a defined portion of pixels in the emitter array 335 to emit the one or more optical beams 345 to dynamically adjust location of the local area 330 illuminated by the illumination light 355 emitted by the portion of pixels, based in part on the emission instructions. The controller 325 may deactivate (e.g., to save power dissipation) one or more defined portions of pixels in the emitter array 335 when the NIR illumination source 310 illuminates only a specific location of the local area 330. In one or more embodiments, by activating a different portion of pixels in the emitter array 335 in each time instant based in part on the emission instructions from the controller 325, the NIR illumination source 310 performs raster scanning of the local area 330 using the illumination light 355 having a line pattern. Once the raster scanning of the local area 330 is done, the controller 325 may instruct a certain portion of pixels in the emitter array 335 to generate the illumination light 355 having a pattern with most energy focused to a specific portion of the local area 330. Note that the emitter array 335 provides for 1:1 relationship between (x, y) coordinate of the emitter array 335 and a real world angle, which allows for focusing energy on a desired spot or portion of the local area 330.

In some embodiments, the controller 325 controls an intensity of each optical beam 345 (e.g., selected from a range of values) emitted from each pixel in the emitter array 335, based in part on the emission instructions. For example, a pixel in the emitter array may emit an optical beam 345 having 25% of a maximum intensity, or 50% of the maximum intensity, etc., based in part on the emission instructions from the controller 325. In one or more embodiments, the controller 325 may provide grayscale based activation of one or more pixels in the emitter array 335, based in part on the emission instructions. The illumination light 355 generated in this manner can be used to obtain information about reflectivity of one or more objects in the local area 330. Additionally, as the projection density is increased by utilizing the grayscale based activation of pixels in the emitter array 335, denser depth data can be obtained, which improves quality of depth determination. In some embodiments, each pixel in the emitter array 335 can emit optical beams 345 having intensities coded in grayscale with hundreds of intensity levels.

In some embodiments, by controlling intensities of the optical beams 345 emitted from pixels in the emitter array 335, the controller 325 adjusts brightness of different patterns of the illumination light 355, based in part on the emission instructions. For example, a first pattern of the illumination light 355 illuminates a portion of the local area 330 with a first brightness during a first time period; and, during a second time period, a second pattern of the illumination light 355 (same or different than the first pattern) illuminates same or different portion of the local area 330 with a second brightness different than the first brightness.

Furthermore, in one or more embodiments, the controller 325 may instruct, based in part on the emission instructions, the array of pixels in the emitter array 335 to emit a pattern of the optical beams 345 such that a brightness of each optical beam 345 may be individually controlled and vary within the pattern of the optical beams 345 (and within a pattern of the illumination light 355).

In some embodiments, the controller 325 is further configured to instruct the array of pixels in the emitter array 335 to emit a pattern of the optical beams 345 as a spatially modulated pattern, based in part on the emission instructions. Alternatively or additionally, the controller 325 is configured to instruct the array of pixels in the emitter array 335 to emit a pattern of the optical beams 345 as a temporally modulated pattern, based in part on the emission instructions. Thus, the controller 325 may control emission of the illumination light 355 having a dynamic projection pattern (e.g., spatially and/or temporally) through programming of pixels in the emitter array 335, based in part on the emission instructions. In some embodiments, the controller 325 may activate at least a pair of pixels in the emitter array 335 to illuminate a spot in the local area 330 taken from different points in time based upon differences in the motion or location of the DCA 300 (and the NIR illumination source 310) relative to a stationary spot. For example, the local area 330 may include a flat wall within the range and field-of-view of the DCA 300. Through a full-frame capture, relatively uniform, flat, and high-confidence measurement results across two or more pixels or depth points may be captured by the imaging device 320 and provided to the controller 325. Then through time and opportunity, as the DCA 300 (and NIR illumination source 310) is moved by the end-user, another region in a sensor of the imaging device 320 is able to capture this same area. At this point, the DCA 300 may purposefully capture data to facilitate online calibration of the emitter array 335, above and beyond the end experience for the user. By capturing the reflected light 360 by the imaging device 320 for the two or more viewpoints of the NIR illumination source 310, efficient online calibration of the emitter array 335 can then be achieved.

As shown in FIG. 3, the controller 325 is further coupled to the imaging device 320 and can be configured to determine depth information for the one or more objects in the local area 330. The controller 325 determines depth information for the one or more objects based in part on the one or more images captured by the imaging device 320. The controller 325 may be configured to determine the depth information based on spatially shifted patterns of the reflected light 360 captured by the imaging device 320 distorted by shapes of the one or more objects in the local area 330, and to use triangulation calculation to obtain a depth map of the local area 330. Alternatively, the controller 325 may be configured to determine the depth information based on time-of-flight information and/or information about a pattern of the reflected structured light 360 distorted by shapes of the one or more objects in the local area 330. In some embodiments, the controller 325 can be configured to determine the depth information based on polarization information of the reflected light 360 and/or polarization information of the illumination light 355.

In some embodiments, the controller 325 may dynamically adjust (e.g., based in part on the emission instructions) brightness of the one or more optical beams 345 emitted from the emitter array 335, based on the determined depth information. In one embodiment, the controller 325 may dynamically adjust a brightness per pixel in the emitter array 335, based on the determined depth information. In other embodiment, the controller 325 may dynamically adjust a brightness per one or more groups of pixels in the emitter array 335, based on the determined depth information. For example, optical beams 345 emitted from a set of pixels in the emitter array 335 used to generate a pattern of the illumination light 355 for illuminating close objects (e.g., hands of a user) are less bright than other optical beams 345 emitted from another set of pixels in the emitter array 335 used to generate another pattern of the illumination light 355 for illuminating far away objects. Alternatively or additionally, the controller 325 may dynamically adjust (e.g., based in part on the emission instructions) pattern location for the illumination light 355, based on the determined depth information. In one or more embodiments, once objects are identified in the local area 330, patterns of the optical beams 345 (and of the illumination light 355) can be emitted to cover only those objects.

In some embodiments, the controller 325 may dynamically adjust (e.g., based in part on the emission instructions) frame rates of emitted patterns of optical beams 345, based on the determined depth information. The controller 325 may instruct one or more groups of pixels in the emitter array 335 to emit patterns of the optical beams 345 with a first frame rate to generate patterns of the illumination light 355 for illuminating and tracking moving objects in the local area 330. Alternatively or additionally, the controller 325 may instruct one or more groups of pixels in the emitter array 335 to emit patterns of the optical beams 345 with a second frame rate lower than the first frame rate to generate patterns of the illumination light 355 for illuminating static objects in the local area 330 (e.g., walls).

The DCA 300 including the NIR illumination source 310 can be used for depth sensing of objects in the local area 330 based on various depth sensing techniques, such as structured light based depth sensing, time-of-flight based depth sensing, stereo vision depth sensing, some other depth sensing technique, or some combination thereof. Online calibration and improved performance of the DCA 300 with the NIR illumination source 310 can be achieved through spatial and temporal multiplexing of patterns included in the illumination light 355. The DCA 300 presented herein is able to correlate known data and geometric features that are consistent across both the physical regions of sensor elements of the imaging device 320 and optical sources (pixels) of the emitter array 335, as well as across spatial and temporal (structured light and time-of-flight techniques) depth recovery pipelines to provide for an online calibration system to remove potential drift or bias issues in the resulting output data streams. Note that, in this case, the DCA 300 may utilize hybrid techniques (i.e., combination of structured light and time-of-flight techniques) for depth sensing.

Figure 4A:
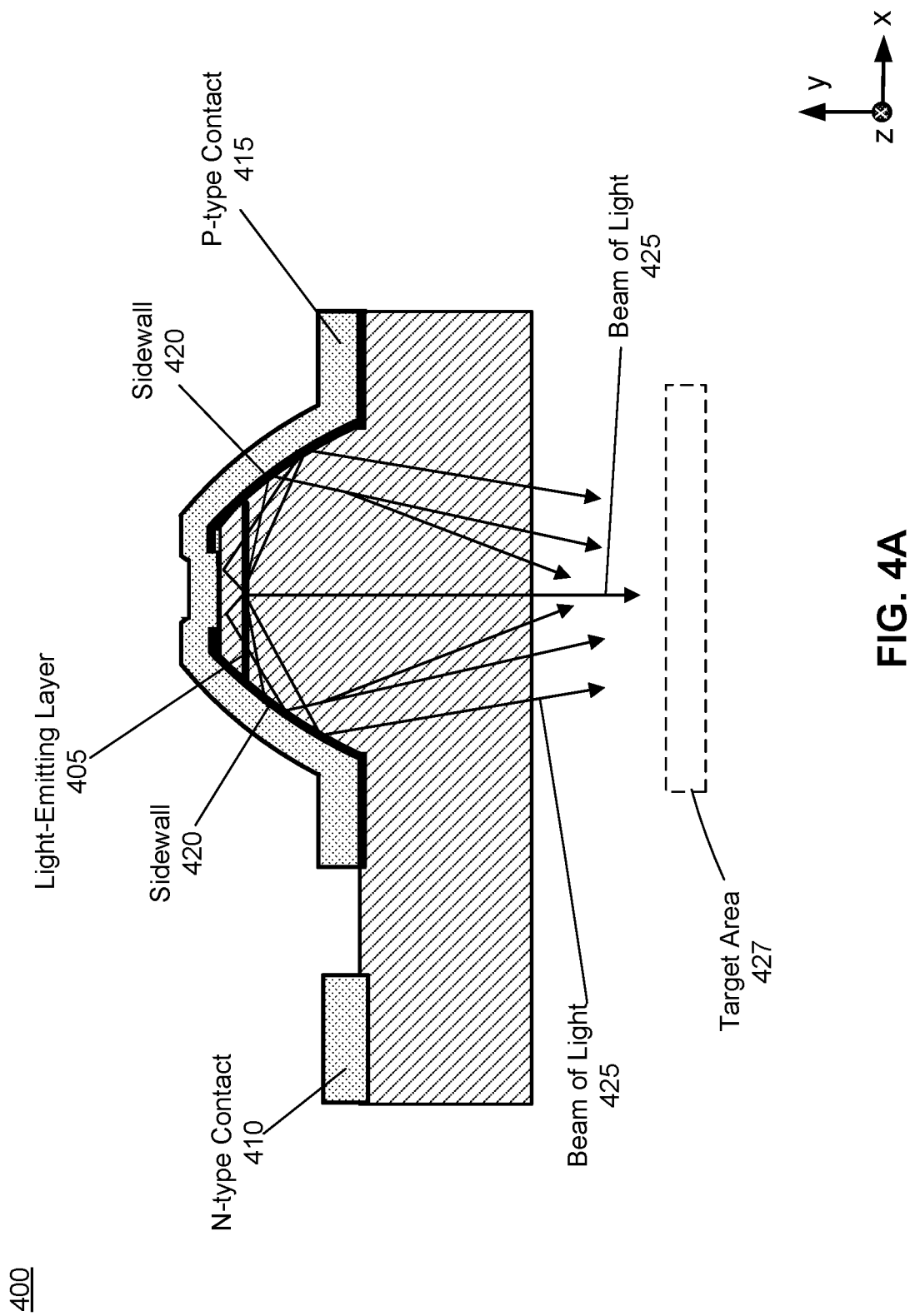
FIG. 4A is a cross-section view of a single micro light-emitting diode (μLED), which may be part of the NIR illuminator in FIG. 3, in accordance with one or more embodiments.

FIG. 4A is a cross-section view of a single μLED 400, in accordance with one or more embodiments. The μLED 400 may be part of the emitter array 335, i.e., the μLED 400 may be an embodiment of an optical source (pixel) in the emitter array 335. Note that the μLED 400 is only an exemplary embodiment of an optical source in the emitter array 335, and other implementations of optical sources in the emitter array 335 are possible. As shown in FIG. 4A, the μLED 400 includes a light-emitting layer 405, n-type contact 410, p-type contact 415, and sidewalls 420 shaped in a manner suitable for light reflection. Once a specific voltage is applied between the n-type contact 410 and the p-type contact 415 (e.g., based in part on the emission instructions from the controller 325 of FIG. 3), electrical current flows through the μLED 400 (not shown in FIG. 4A) creating spontaneous light emission from the light-emitting layer 405. In one embodiment, a beam of light 425 (e.g., an optical beam 345 of FIG. 3) can be directly emitted from the light-emitting layer 405 into a target area 427, e.g., toward the optical assembly 340 of FIG. 3. In some embodiments, a width of the target area 427 (e.g., along x axis) is between, e.g., approximately 5 μm and 25 μm. In another embodiment, another beam of light 425 (e.g., another optical beam 345 of FIG. 3) emitted from the light-emitting layer 405 is reflected from at least one sidewall 420 before reaching the target area 427. Note that a beam of light 425 emitted from the light-emitting layer 405 may be reflected from any sidewall 420 under total internal reflection, i.e., no energy is lost when the beam of light 425 reaches the target area 427.

Figure 4B:
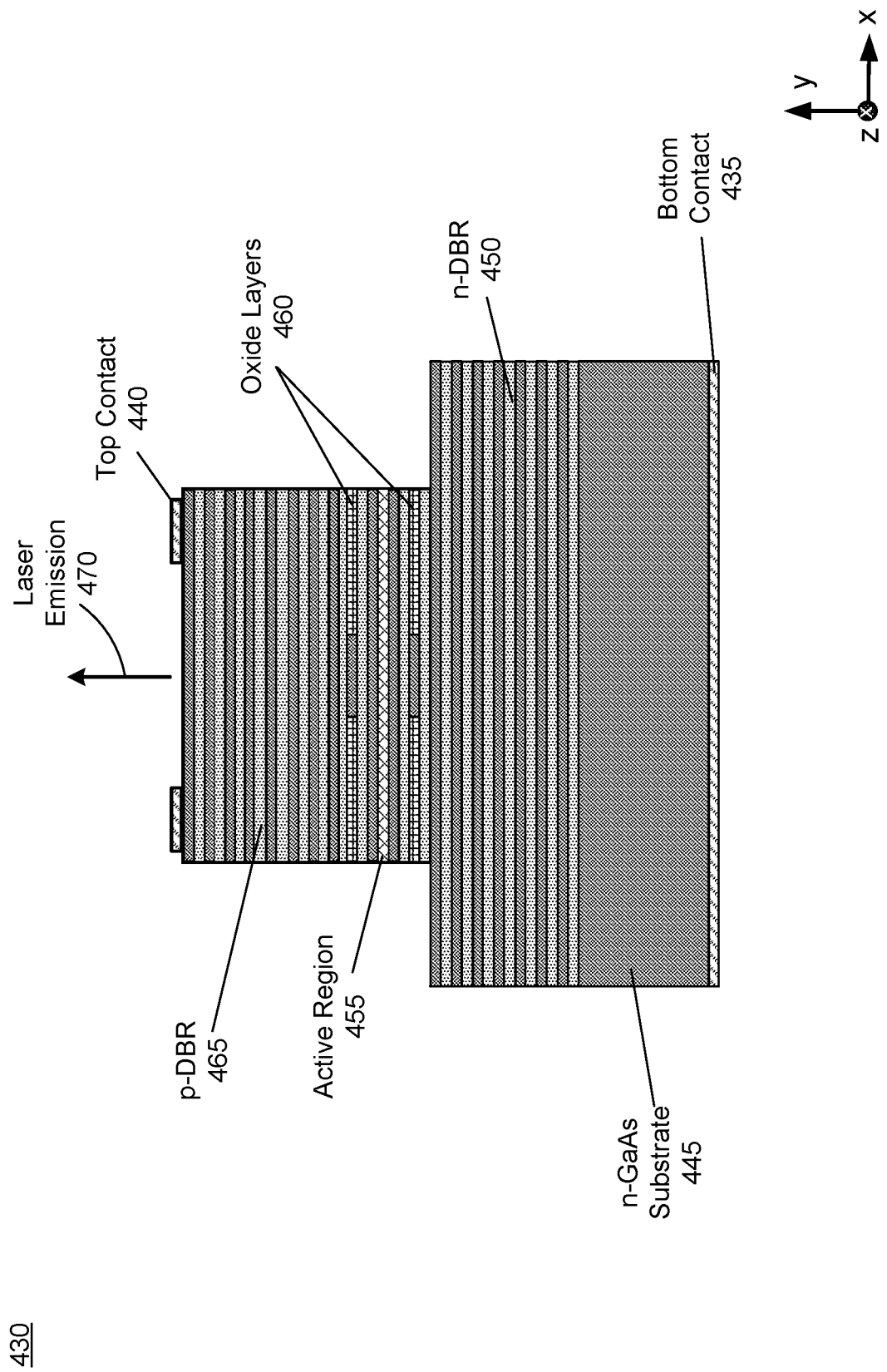
FIG. 4B is a cross-section view of a single vertical-cavity surface-emitting laser (VCSEL), which may be part of the NIR illuminator in FIG. 3, in accordance with one or more embodiments.

FIG. 4B is a cross-section view of a VCSEL 430, in accordance with one or more embodiments. The VCSEL 430 may be part of the emitter array 335, i.e., the VCSEL 430 may be an embodiment of an emission element (pixel) in the emitter array 335. Note that the VCSEL 430 is only an exemplary embodiment of an optical source in the emitter array 335, and other implementations of optical sources in the emitter array 335 are possible. The VCSEL 430 includes a bottom contact 435 (e.g., n-contact) and one or more top contacts 440 (e.g., one or more p-contacts). Between the bottom contact 435 and the top contact 440, the VCSEL 430 further includes n-type Gallium-Arsenide (n-GaAs) substrate 445 coupled to the bottom contact 435, n-type distributed Bragg reflector (n-DBR) 450 positioned above the n-GaAs substrate 440, an active region 455 (e.g., p-type region) located between a pair of oxide layers 460 positioned above the n-DBR 450, and p-type distributed Bragg reflector (p-DBR) 465 coupled to the top contacts 440. Once a specific voltage is applied between the bottom contact 443 and the one or more top contacts 440 (e.g., based in part on the emission instructions from the controller 325 of FIG. 3), electrical current flows through the VCSEL 430 (not shown in FIG. 4A) creating laser emission 470 from the p-DBR 465 out of the VCSEL 430. The laser emission 470 may be an embodiment of an optical beam 345 emitted at a time instant from one emission element in the emitter array 335, i.e., from a pixel implemented as VCSEL.

Figure 4C:
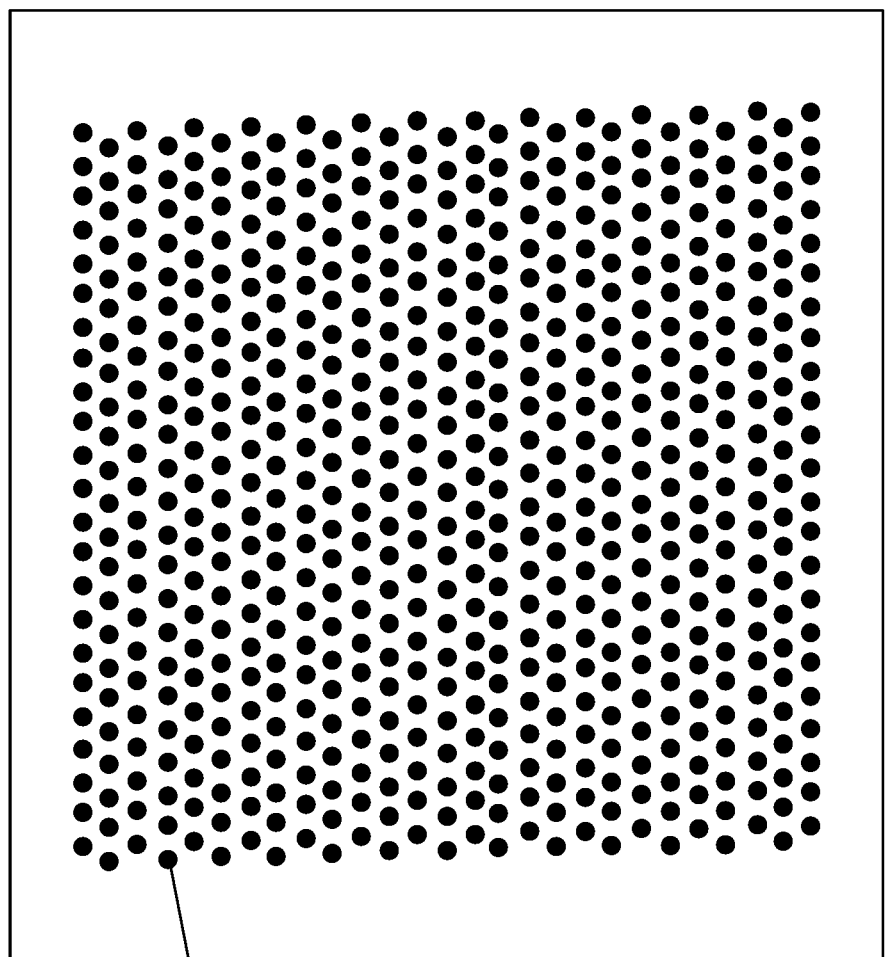
FIG. 4C is an example illumination pattern generated by an array of optical sources (pixels) of the NIR illumination source in FIG. 3, in accordance with one or more embodiments.

FIG. 4C is an example illumination pattern 480 generated by an array of optical sources (pixels) of a NIR illumination source, in accordance with one or more embodiments. The array of optical sources generating the illumination pattern 480 may be an embodiment of a plurality of optical sources (pixels) in the emitter array 335 of FIG. 3; and the illumination pattern 480 may be an embodiment of a pattern of the illumination light 355 generated by the NIR illumination source 310 of FIG. 3. In some embodiments, the illumination pattern 480 represents a full dense illumination pattern obtained by applying an integrated square array of micro-lenses in front of the emitter array 335 of FIG. 3. In one or more embodiments, the array of optical sources generating the illumination pattern 480 includes an array of VCSELs 430 of FIG. 4B. The illustrative embodiment in FIG. 4C shows the illumination pattern 480 as a dot pattern of light. However, other illumination patterns are possible (e.g., line patterns) based on implementation of optical sources (e.g., VCSELs 430) in the array. Each dot in the illumination pattern 480 represents a beam of light 485 that originates from a different optical sources (e.g., VCSEL 430) in the array (e.g., array of VCSELs 430). As aforementioned, VCSELs feature uncontrolled polarization instability and this polarization diversity facilitates mitigation of the speckle effect in the illumination pattern 480 compared to that of optical sources based on edge-emitting lasers, thus acquiring more accurate and less noisy depth sensing measurements.

Figure 5:
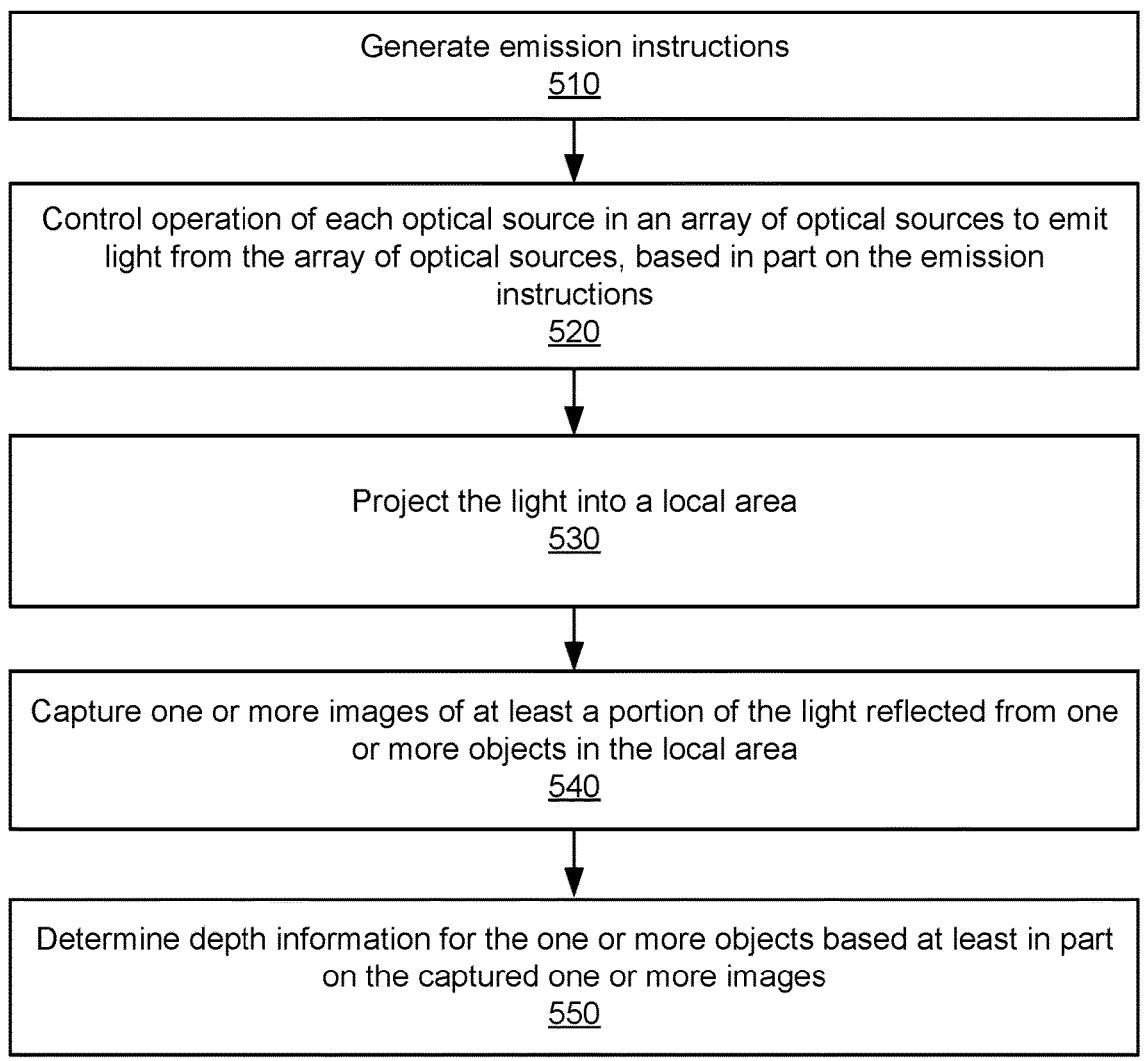
FIG. 5 is a flow chart illustrating a process of determining depth information of objects in a local area, in accordance with one or more embodiments.

FIG. 5 is a flow chart illustrating a process 500 of determining depth information of objects in a local area, in accordance with one or more embodiments. The process 500 of FIG. 5 may be performed by the components of a DCA (e.g., the DCA 300 and/or the DCA 230). Other entities (e.g., a NED and/or console) may perform some or all of the steps of the process in other embodiments. Likewise, embodiments may include different and/or additional steps, or perform the steps in different orders.

The DCA generates 510 (e.g., via a controller) emission instructions. The DCA may provide the emission instructions to an illumination source. Based on the emission instructions, the illumination source may emit one or more light beams using one or more pixels in an array of pixels. Based on the emission instructions, light emitted from the illumination source may have a specific intensity, pattern, modulation (spatial, temporal), etc. In some embodiments, the DCA generates the emission instructions which include electrical signals that control operation of each individual pixel in the array, such as activation of the pixel, deactivation of the pixel, and emission of light from the pixel having a defined intensity value selected from a range of values.

The DCA controls 520 (e.g., via the controller) operation of each pixel in the array of pixels to emit light from the array of pixels, based in part on the emission instructions. In one embodiment, the DCA controls, dynamically and selectively, emission of the light from one or more groups of neighboring pixels in the array, based in part on the emission instructions. In other embodiment, the DCA dynamically adjusts a pattern of the light emitted into a local area by instructing a defined portion of pixels in the array to emit the light, based in part on the emission instructions. In yet other embodiment, the DCA dynamically adjusts a location of the local area illuminated by the light emitted by a portion of pixels in the array by instructing the portion of pixels to emit the light, based in part on the emission instructions. In yet other embodiment, the DCA controls, dynamically and selectively, an intensity of at least one light beam emitted from at least one pixel in the array, based in part on the emission instructions.

The DCA projects 530 (e.g., via an optical assembly) the light into the local area. The optical assembly projecting the light includes one or more optical elements, e.g., one or more projection lenses. In some embodiments, the optical assembly includes an array of micro-lenses positioned in front of the array of pixels. The array of micro-lenses may be configured to improve quality of light beams in the light for more efficient projection of the light by the one or more projection lenses.

The DCA captures 540 (e.g., via an imaging device) one or more images of at least a portion of the light reflected from one or more objects in the local area. In some embodiments, the imaging device includes a two-dimensional detector pixel array that captures the one or more images. In other embodiments, the imaging device includes more than one camera for capturing the one or more images. In some embodiments, the light comprises a structured light pattern, and the imaging device is configured to capture the one or more images of at least a portion of the structured light pattern reflected from the one or more objects. In other embodiments, the imaging device is configured to capture the one or more images of at least a portion of temporally modulated light reflected from the one or more objects.

The DCA determines 550 (e.g., via the controller) depth information for the one or more objects based in part on the captured one or more images. In some embodiments, the DCA determines the depth information for the one or more objects based in part on the captured one or more images of at least the portion of the structured light pattern. In other embodiments, the DCA determines the depth information for the one or more objects by using time-of-flight information included in the captured one or more images.

In some embodiments, the DCA is configured as part of a NED, e.g., the NED 100 in FIG. 1. In one embodiment, the DCA provides the determined depth information to a console coupled to the NED. The console is then configured to generate content for presentation on an electronic display of the NED, based on the depth information. In another embodiment, the DCA provides the determined depth information to a module of the NED that generates content for presentation on the electronic display of the NED, based on the depth information. In an alternate embodiment, the DCA is integrated into a NED as part of an AR system. In this case, the NED may be configured to sense and display objects behind a head of a user wearing the NED or display objects recorded previously. In yet other embodiments, the DCA is integrated into a base station or a sensor bar external to the NED. In this case, the DCA may be configured to sense various body parts of a user wearing the NED, e.g., the user's lower body. In yet other embodiment, the DCA is configured as part of a controller or as part of a capture system to capture VR content, AR content, and/or MR content.

In some embodiments, the DCA presented herein and mounted on a NED (or integrated into a frame of the NED) can be configured for hand tracking of a user wearing the NED. In other embodiments, the DCA presented herein is configured to generate a hand gesture recognition input. In yet other embodiments, the DCA presented herein is configured to determine object occlusion information, which may be displayed on an electronic display of the NED. In yet other embodiments, the DCA presented herein is configured for depth reconstruction. Alternatively, the DCA presented herein can be part of a device external to a NED, and can be configured for recording the geometry of a user or a local area, hand-tracking, eye-tracking, etc.

System Environment

Figure 6:
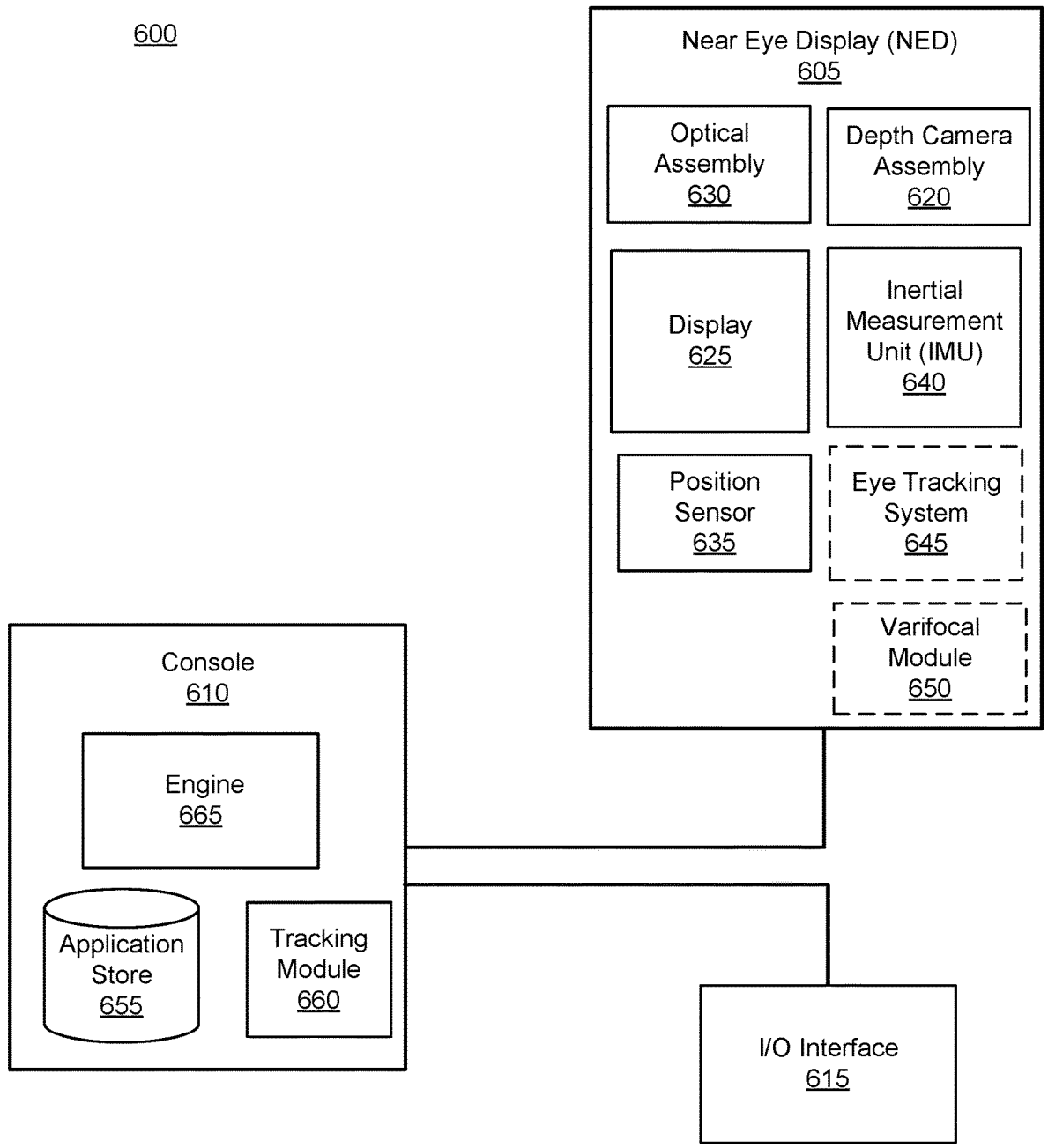
FIG. 6 is a block diagram of a system environment that includes the NED shown in FIG. 1, in accordance with one or more embodiments.

FIG. 6 is a block diagram of one embodiment of a NED system 600 in which a console 610 operates. The NED system 600 may operate in an artificial reality system environment, e.g., a VR system environment, an AR system environment, a MR system environment, or some combination thereof. The NED system 600 shown by FIG. 6 comprises a NED 605 and an input/output (I/O) interface 615 that is coupled to the console 610. While FIG. 6 shows an example NED system 600 including one NED 605 and on I/O interface 615, in other embodiments any number of these components may be included in the NED system 600. For example, there may be multiple NEDs 605 each having an associated I/O interface 615, with each NED 605 and I/O interface 615 communicating with the console 610. In alternative configurations, different and/or additional components may be included in the NED system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the NED 605.

The NED 605 is a near-eye display or a head-mounted display that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the NED 605, the console 610, or both, and presents audio data based on the audio information. The NED 605 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the NED 605 is the NED 100 described above in conjunction with FIG. 1.

The NED 605 may include a DCA 620, a display 625, an optical assembly 630, one or more position sensors 635, an IMU 640, an optional eye tracking system 645, and an optional varifocal module 650. Some embodiments of the NED 605 have different components than those described in conjunction with FIG. 6. Additionally, the functionality provided by various components described in conjunction with FIG. 6 may be differently distributed among the components of the NED 605 in other embodiments.

The DCA 620 captures data describing depth information of an area surrounding the NED 605. The data describing depth information may be associated with one or a combination of the following techniques used to determine depth information: structured light, stereo vision, time of flight, some other depth determination technique, or some combination thereof. The DCA 620 can compute the depth information using the data, or the DCA 620 can send this information to another device such as the console 610 that can determine the depth information using data from the DCA 620.

The DCA 620 includes an illumination source, an imaging device, and a controller. The illumination source emits light onto a local area surrounding the NED 605 in accordance with emission instructions, e.g., provided by the controller. The illumination source includes an array of pixels and an optical assembly. Operation of each pixel in the array can be controlled based in part on the emission instructions (e.g., provided by the controller) to emit the light from the array of pixels. The optical assembly is configured to project the light into the local area. The illumination source includes a plurality of emitters (pixels) that each emits light having certain characteristics (e.g., wavelength, polarization, coherence, temporal behavior, etc.). The characteristics may be the same or different between pixels, and the pixels can be operated simultaneously or individually. In some embodiment, the plurality of emitters could be, e.g., surface emitting lasers (e.g., VCSELs), inorganic or organic LEDs, μLEDs, μRCLEDs, μSLDs, or some other source. In some embodiments, a single or multiple groups of pixels in the illumination source can emit light having a structured light pattern. In other embodiments, one or more pixels in the illumination source can emit temporally modulated light. The imaging device captures one or more images of at least a portion of the light reflected from one or more objects in the local area. The imaging device may be a camera configured to operate in the NIR spectrum. The controller coordinates how the illumination source emits light and how the imaging device captures light. In some embodiments, the controller also determines depth information associated with the local area using the captured one or more images. Embodiments of the DCA 620 are the DCA 230 and the DCA 300 described in conjunction with FIGS. 2-3.

The display 625 displays two-dimensional or three-dimensional images to the user in accordance with data received from the console 610. In various embodiments, the display 625 comprises a single display or multiple displays (e.g., a display for each eye of a user). Examples of the electronic display 625 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, some other display, a scanner, one-dimensional array, or some combination thereof. Content displayed on the display 625 may include the depth information determined by the DCA 620. An embodiment of the display 625 is the display assembly 210 described above in conjunction with FIG. 2.

The optical assembly 630 magnifies image light received from the display 625, corrects optical errors associated with the image light, and presents the corrected image light to a user of the NED 605. The optical assembly 630 includes a plurality of optical elements. Example optical elements included in the optical assembly 630 include: an aperture, a Fresnel lens, a convex lens, a concave lens, a filter, a reflecting surface, or any other suitable optical element that affects image light. Moreover, the optical assembly 630 may include combinations of different optical elements. In some embodiments, one or more of the optical elements in the optical assembly 630 may have one or more coatings, such as partially reflective or anti-reflective coatings.

Magnification and focusing of the image light by the optical assembly 630 allows the display 625 to be physically smaller, weigh less and consume less power than larger displays. Additionally, magnification may increase the field of view of the content presented by the display 625. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 630 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display 625 for display is pre-distorted, and the optical assembly 630 corrects the distortion when it receives image light from the display 625 generated based on the content.

The IMU 640 is an electronic device that generates data indicating a position of the NED 605 based on measurement signals received from one or more of the position sensors 635 and from depth information received from the DCA 620. A position sensor 635 generates one or more measurement signals in response to motion of the NED 605. Examples of position sensors 635 include: one or more accelerometers, one or more gyroscopes, one or more magnetometers, another suitable type of sensor that detects motion, a type of sensor used for error correction of the IMU 640, or some combination thereof. The position sensors 635 may be located external to the IMU 640, internal to the IMU 640, or some combination thereof.

Based on the one or more measurement signals from one or more position sensors 635, the IMU 640 generates data indicating an estimated current position of the NED 605 relative to an initial position of the NED 605. For example, the position sensors 635 include multiple accelerometers to measure translational motion (forward/back, up/down, left/right) and multiple gyroscopes to measure rotational motion (e.g., pitch, yaw, roll). In some embodiments, the IMU 640 rapidly samples the measurement signals and calculates the estimated current position of the NED 605 from the sampled data. For example, the IMU 640 integrates the measurement signals received from the accelerometers over time to estimate a velocity vector and integrates the velocity vector over time to determine an estimated current position of a reference point on the NED 605. Alternatively, the IMU 640 provides the sampled measurement signals to the console 610, which interprets the data to reduce error. The reference point is a point that may be used to describe the position of the NED 605. The reference point may generally be defined as a point in space or a position related to the NED's 605 orientation and position.

The IMU 640 receives one or more parameters from the console 610. The one or more parameters are used to maintain tracking of the NED 605. Based on a received parameter, the IMU 640 may adjust one or more IMU parameters (e.g., sample rate). In some embodiments, certain parameters cause the IMU 640 to update an initial position of the reference point so it corresponds to a next position of the reference point. Updating the initial position of the reference point as the next calibrated position of the reference point helps reduce accumulated error associated with the current position estimated the IMU 640. The accumulated error, also referred to as drift error, causes the estimated position of the reference point to "drift" away from the actual position of the reference point over time. In some embodiments of the NED 605, the IMU 640 may be a dedicated hardware component. In other embodiments, the IMU 640 may be a software component implemented in one or more processors.

In some embodiments, the eye tracking system 645 is integrated into the NED 605. The eye tracking system 645 determines eye tracking information associated with an eye of a user wearing the NED 605. The eye tracking information determined by the eye tracking system 645 may comprise information about a position of the user's eye, i.e., information about an angle of an eye-gaze. The eye-tracking system 645 may comprise one or more illumination sources and an imaging device (camera).

In some embodiments, the varifocal module 650 is further integrated into the NED 605. The varifocal module 650 may be coupled to the eye tracking system 645 to obtain eye tracking information determined by the eye tracking system 645. The varifocal module 650 may be configured to adjust focus of image light emitted from the display 625, based on the determined eye tracking information obtained from the eye tracking system 645. In this way, the varifocal module 650 can mitigate vergence-accommodation conflict in relation to the image light. The varifocal module 650 can be interfaced (e.g., either mechanically or electrically) with at least one optical element of the optical assembly 630. Then, the varifocal module 650 may be configured to adjust focus of the image light emitted from the display 625 and propagated through the optical assembly 630 by adjusting an optical position of the at least one optical element of the optical assembly 630, based on the determined eye tracking information obtained from the eye tracking system 645. By adjusting the optical position, the varifocal module 650 varies focus of the image light propagated through the optical assembly 630 towards the user's eye. The varifocal module 650 may be also configured to adjust resolution of the image light emitted by the display 625 by performing foveated rendering of the image light, based at least in part on the determined eye tracking information obtained from the eye tracking system 645. In this case, the varifocal module 650 provides appropriate image signals to the display 625. The varifocal module 650 provides image signals with a maximum pixel density for the display 625 only in a foveal region of the user's eye-gaze, while providing image signals with lower pixel densities in other regions.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 includes an IMU 640 that captures calibration data indicating an estimated position of the I/O interface 615 relative to an initial position of the I/O interface 615. In some embodiments, the I/O interface 615 may provide haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the NED 605 for processing in accordance with information received from one or more of: the DCA 620, the NED 605, and the I/O interface 615. In the example shown in FIG. 6, the console 610 includes an application store 655, a tracking module 660, and an engine 665. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the NED 605 or the I/O interface 615. Examples of applications include: gaming applications, conferencing applications, video playback applications, or other suitable applications.

The tracking module 660 calibrates the NED system 600 using one or more calibration parameters and may adjust one or more calibration parameters to reduce error in determination of the position of the NED 605 or of the I/O interface 615. For example, the tracking module 660 communicates a calibration parameter to the DCA 620 to adjust the focus of the DCA 620 to more accurately determine positions of structured light elements captured by the DCA 620. Calibration performed by the tracking module 660 also accounts for information received from the IMU 640 in the NED 605 and/or an IMU 640 included in the I/O interface 615. Additionally, if tracking of the NED 605 is lost (e.g., the DCA 620 loses line of sight of at least a threshold number of structured light elements), the tracking module 660 may re-calibrate some or all of the NED system 600.

The tracking module 660 tracks movements of the NED 605 or of the I/O interface 615 using information from the DCA 620, the one or more position sensors 635, the IMU 640 or some combination thereof. For example, the tracking module 660 determines a position of a reference point of the NED 605 in a mapping of a local area based on information from the NED 605. The tracking module 660 may also determine positions of the reference point of the NED 605 or a reference point of the I/O interface 615 using data indicating a position of the NED 605 from the IMU 640 or using data indicating a position of the I/O interface 615 from an IMU 640 included in the I/O interface 615, respectively. Additionally, in some embodiments, the tracking module 660 may use portions of data indicating a position or the NED 605 from the IMU 640 as well as representations of the local area from the DCA 620 to predict a future location of the NED 605. The tracking module 660 provides the estimated or predicted future position of the NED 605 or the I/O interface 615 to the engine 665.

The engine 665 generates a three-dimensional mapping of the area surrounding the NED 605 (i.e., the "local area") based on information received from the NED 605. In some embodiments, the engine 665 determines depth information for the three-dimensional mapping of the local area based on information received from the DCA 620 that is relevant for techniques used in computing depth. The engine 665 may calculate depth information using one or more techniques in computing depth from the portion of the reflected light detected by the DCA 620, such as the stereo based techniques, the structured light illumination technique, and the time-of-flight technique. In various embodiments, the engine 665 uses the depth information to, e.g., update a model of the local area, and generate content based in part on the updated model.

The engine 665 also executes applications within the NED system 600 and receives position information, acceleration information, velocity information, predicted future positions, or some combination thereof, of the NED 605 from the tracking module 660. Based on the received information, the engine 665 determines content to provide to the NED 605 for presentation to the user. For example, if the received information indicates that the user has looked to the left, the engine 665 generates content for the NED 605 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the NED 605 or haptic feedback via the I/O interface 615.

In some embodiments, based on the eye tracking information (e.g., orientation of the user's eye) received from the eye tracking system 645, the engine 665 determines resolution of the content provided to the NED 605 for presentation to the user on the display 625. The engine 665 may be configured to adjust resolution of the content provided to the NED 605 by performing foveated rendering of the presented content, based at least in part on the determined eye tracking information obtained from the eye tracking system 645. The engine 665 provides the content to the NED 605 having a maximum resolution on the display 625 in a foveal region of the user's gaze, whereas the engine 665 provides a lower resolution in other regions, thus achieving less power consumption at the NED 605 and saving computing cycles of the console 610 without compromising a visual experience of the user. In some embodiments, the engine 665 can further use the eye tracking information to adjust focus of the image light emitted from the display 625 to prevent the vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An illumination source comprising:
   an emitter array including a plurality of pixels configured to emit a plurality of optical beams in accordance with emission instructions; and
   a controller configured to:
      generate the emission instructions for controlling the pixels in the emitter array, and
      code, in grayscale with a defined bit resolution, an intensity level of a plurality of intensity levels for each optical beam of the plurality of optical beams by activating each pixel of the plurality of pixels to start emitting each optical beam of the plurality of optical beams at a respective first time instant based on the emission instructions and by deactivating each pixel of the plurality of pixels to stop emitting each optical beam of the plurality of optical beams at a respective second time instant based on the emission instructions, a number of the plurality of intensity levels for each optical beam of the plurality of optical beams emitted from each pixel of the plurality of pixels is more than two, and the number of the plurality of intensity levels depends on the defined bit resolution.

2. The illumination source of claim 1, wherein the controller is further configured to:
   activate each group of a plurality of groups of pixels in the emitter array for light emission during a respective time period, based on the emission instructions.

3. The illumination source of claim 1, wherein the controller is further configured to:
   instruct one or more pixels in the emitter array to emit one or more optical beams of the plurality of optical beams for a controllable amount of time, based on the emission instructions.

4. The illumination source of claim 1, wherein the controller is further configured to:
   adjust a pattern of light comprising the plurality of optical beams by activating a first portion of pixels in the emitter array and by deactivating a second portion of pixels in the emitter array, based on the emission instructions.

5. The illumination source of claim 1, wherein the controller is further configured to:
   instruct a defined portion of pixels in the emitter array to emit light comprising a portion of the plurality of optical beams to adjust a location of a local area illuminated by the emitted light, based on the emission instructions.

6. The illumination source of claim 1, wherein the controller is further configured to:
   instruct the emitter array to emit the plurality of optical beams as at least one of temporally modulated light and spatially modulated light, based on the emission instructions.

7. The illumination source of claim 1, wherein the controller is further configured to:
   dynamically change a pattern of the plurality of optical beams from one time period to another time period of a plurality of time periods by activating a corresponding group of pixels in the emitter array for a respective time period, based on the emission instructions.

8. The illumination source of claim 1, wherein the controller is further configured to:
instruct one or more groups of pixels in the emitter array to emit patterns of the plurality of optical beams with a defined rate to generate patterns of illumination light for illuminating and tracking at least one moving object in a local area, the defined rate based on information about a velocity of the at least one moving object.

9. The illumination source of claim 1, wherein each pixel of the plurality of pixels in the emitter array is selected from a group consisting of a micro light-emitting diode (μLED), a micro resonant cavity light-emitting diode (μRCLED), a vertical-cavity surface-emitting laser (VCSEL), and a micro super luminescent diode (μSLD).

10. The illumination source of claim 1, wherein the emitter array includes an array of micro-lenses, each micro-lens in the array of micro-lenses positioned in front of a respective pixel of the plurality of pixels in the emitter array.

11. A depth camera assembly (DCA) comprising:
an illumination source including:
an emitter array including a plurality of pixels configured to emit the plurality of optical beams in accordance with emission instructions, and
a projection assembly configured to project light comprising the plurality of optical beams into a local area;
a controller configured to:
generate the emission instructions for controlling the pixels in the emitter array, and
code, in grayscale with a defined bit resolution, an intensity level of a plurality of intensity levels for each optical beam of the plurality of optical beams by activating each pixel of the plurality of pixels to start emitting each optical beam of the plurality of optical beams at a respective first time instant based on the emission instructions and by deactivating each pixel of the plurality of pixels to stop emitting each optical beam of the plurality of optical beams at a respective second time instant based on the emission instructions, a number of the plurality of intensity levels for each optical beam of the plurality of optical beams emitted from each pixel of the plurality of pixels is more than two, and the number of the plurality of intensity levels depends on the defined bit resolution; and
an imaging device configured to capture one or more images of at least a portion of the light reflected from one or more objects in the local area, wherein
the controller is further configured to determine depth information for the one or more objects based in part on the captured one or more images.

12. The DCA of claim 11, wherein the controller is further configured to:
adjust an intensity of at least one optical beam of the plurality of optical beams emitted from at least one pixel of the plurality of pixels in the emitter array based on the depth information.

13. The DCA of claim 11, wherein the controller is further configured to:
adjust a location of a pattern of the light at which the local area is illuminated, based on the depth information.

14. The DCA of claim 11, wherein the controller is further configured to:
adjust rates of emitted patterns of the plurality of optical beams based on the depth information.

15. The DCA of claim 11, wherein:
the controller is further configured to instruct the emitter array to emit the plurality of optical beams as structured light based on the emission instructions,
the imaging device is further configured to capture the one or more images of at least a portion of the structured light reflected from the one or more objects, and
the controller is further configured to determine the depth information for the one or more objects based on the captured one or more images of at least the portion of the structured light.

16. The DCA of claim 11, wherein the controller is further configured to:
instruct the emitter array to emit the plurality of optical beams as temporally modulated light, based on the emission instructions; and
determine the depth information for the one or more objects by using time-of-flight information included in the captured one or more images.

17. The DCA of claim 1, wherein the controller is further configured to:
determine the depth information for the one or more objects by applying stereo vision depth sensing to the captured one or more images.

18. A method comprising:
generating emission instructions for controlling a plurality of pixels in an emitter array;
instructing the plurality of pixels in the emitter array to emit a plurality of optical beams using the emission instructions; and
coding, in grayscale with a defined bit resolution, an intensity level of a plurality of intensity levels for each optical beam of the plurality of optical beams by activating each pixel of the plurality of pixels to start emitting each optical beam of the plurality of optical beams at a respective first time instant based on the emission instructions and by deactivating each pixel of the plurality of pixels to stop emitting each optical beam of the plurality of optical beams at a respective second time instant based on the emission instructions, a number of the plurality of intensity levels for each optical beam of the plurality of optical beams emitted from each pixel of the plurality of pixels is more than two, and the number of the plurality of intensity levels depends on the defined bit resolution.

* * * * *